US012332082B2

(12) United States Patent
Arnason

(10) Patent No.: US 12,332,082 B2
(45) Date of Patent: Jun. 17, 2025

(54) METHOD AND A SYSTEM FOR MONITORING IN REAL TIME AN ANGULAR POSITION OF AN ASSET

(71) Applicant: Controlant hf., Kopavogur (IS)

(72) Inventor: Gudmundur Arni Arnason, Kopavogur (IS)

(73) Assignee: CONTROLANT HF., Kopavogur (IS)

( * ) Notice: Subject to any disclaimer, the term of this patent is extended or adjusted under 35 U.S.C. 154(b) by 0 days.

(21) Appl. No.: 18/786,938

(22) Filed: Jul. 29, 2024

(65) Prior Publication Data
US 2025/0044084 A1     Feb. 6, 2025

(30) Foreign Application Priority Data
Aug. 1, 2023   (EP) ..................... 23188857

(51) Int. Cl.
| G06F 11/30 | (2006.01) |
| G01C 9/06  | (2006.01) |
| G01D 9/00  | (2006.01) |
| H04Q 9/02  | (2006.01) |

(52) U.S. Cl.
CPC .............. *G01C 9/06* (2013.01); *H04Q 9/02* (2013.01); *H04Q 2209/826* (2013.01)

(58) Field of Classification Search
CPC ...... G06F 11/3058; G06F 17/40; G01D 9/007
See application file for complete search history.

(56) References Cited

U.S. PATENT DOCUMENTS

| 2007/0152841 A1 | 7/2007 | Eren et al. |
| 2014/0262918 A1 | 9/2014 | Chu |
| 2021/0215482 A1 | 7/2021 | Fonk et al. |
| 2023/0110898 A1* | 4/2023 | Kim ................... G06F 11/0784 705/332 |
| 2023/0115842 A1* | 4/2023 | Kim ....................... G06F 17/40 714/45 |

FOREIGN PATENT DOCUMENTS

WO    WO2006054542 A1 *   5/2008

OTHER PUBLICATIONS

WO2006054542-A1 English Language Translation (Year: 2005).*
Extended European Search Report from Corresponding European Patent Application EP23188857.9, Jan. 23, 2024.

* cited by examiner

*Primary Examiner* — Curtis A Kuntz
*Assistant Examiner* — Jerold B Murphy
(74) *Attorney, Agent, or Firm* — Workman Nydegger

(57) ABSTRACT

A method and a system are provided for monitoring in real-time at least one environmental-related parameter of an asset while transporting the asset. The monitoring is performed using a logger device. The method includes: turning the logger device to an on-power mode; associating, before starting the transport from the beginning location, the logger device to the asset by either placing the logger device into an inner side of the packaging material containing the asset or at an outer side of the packaging material; and measuring an initial angular position of the logger device before starting the transport from the beginning location. The measured angular position is used as a reference angular position for the logger device during transport from the beginning location to the destination location by determining if a change in the angular position of the logger device exceeds the pre-defined angular reference value.

10 Claims, 4 Drawing Sheets

METHOD AND A SYSTEM FOR MONITORING IN REAL TIME AN ANGULAR POSITION OF AN ASSET

FIELD OF THE INVENTION

The present invention relates to a method and a system for monitoring in real time the angular position of an asset while being transported by a transport means.

BACKGROUND OF THE INVENTION

With the expansion and growth of global sourcing in the supply chain industry, more prevalent interest has been placed on automatic electronic monitoring of environment related parameters to increase food and drug safety and improve food defense systems throughout all areas of production, processing, storage, transportation and operations. Food and drug products require proper handling of environment related parameters such as temperature during transport to assure shelf quality, longevity, and safety.

Logger devices are electronic monitoring devices commonly used for these purposes and are configured to be associated to assets such as food, beverages or pharmaceutical products to automatically monitor and record various environmental related parameters of the assets throughout the supply chain, such as temperature, humidity, acceleration, and air pressure over time. A recent example of importance of such logger devices is the temperature monitoring of the COVID-19 vaccines, which is a critical monitoring parameter.

Logger devices used for real time monitoring have a wireless communication module to allow them to transmit position data of the logger devices together with measured environmental related data of the asset wirelessly and, in that way, enabling a real time supply chain monitoring solution during the transport of the assets. This means that positional data of the logger device (and thus of the asset) together with measured environmental data such as the temperature of the assets are provided in real time. By doing so, it is possible to monitor the position and the environmental condition of the assets in real time. Thus, issues such as the temperature of the asset being too high or too low may be identified before these issues escalate which allows for proactive actions to prevent the assets from being damaged.

The angular position of the logger devices can in some instances be a key parameter during the real time monitoring of assets and be an important parameter for the quality assurance of said assets. This may as an example be relevant when cooling media is placed into the packaging material to provide the necessary cooling for the asset. As an example, some of the COVID-19 vaccines, were cooled down to −80° C. during their transport using dry ice as a cooling media. In such a scenario it is essential that the package is handled in a way that the initial arrangement, e.g. initial top side up orientation, is preserved during the transport. Referring to the example above, the resting of the package sideways instead of top side up may result in that the dry ice may no longer provide the required cooling effect because not all the vaccine is being properly surrounded by the dry ice.

One of the challenges today is false positive alarms that are triggered during the transport of the assets. This may be because the logger devices were not properly placed into the package, e.g. because an operator was not following the instructions of placing the logger device with the front side facing upwards, but instead placed the logger device with the front side facing side-ways. Such a human error leads to false positive event that can be very time consuming to process and may result in that the person driving the transport vehicle may be informed that a package is not placed as it should be, and the driver thus might need to stop the transport vehicle to check it out. A possible subsequent process is that the driver communicates that the package is indeed safe and placed as it should be.

SUMMARY OF THE INVENTION

It is an object of the invention to provide a reliable tilting method and a system where such false positive events are eliminated and where it is possible to inform in real time if the angular positions of packages containing sensitive assets have exceeded a pre-defined limit.

In general, the invention preferably seeks to mitigate, alleviate or eliminate one or more of the above-mentioned disadvantages of the prior art singly or in any combination. In particular, it may be seen as an object of embodiments of the present invention to provide a method and a system that solves the above-mentioned problems, or other problems.

To better address one or more of these concerns, in a first aspect a method is provided of monitoring in real time the angular position of an asset while transporting the asset from a beginning location to a destination location, where the monitoring is performed using a logger device, the method comprising:
  turning the logger device to a power-on mode,
  associating, prior to starting the transport from the beginning location, the logger device to the asset by either placing the logger device into an inner side of a packaging material containing the asset or at an outer side of the packaging material,
  measuring, subsequent to associating the logger device to the asset, an initial angular position of the logger device prior to starting the transport from the beginning location,
  wherein the measured angular position is utilized as a unique reference angular position for the logger device during transport from the beginning location to the destination location, and where the method further comprises:
  determining, subsequent to the start of the transport from the beginning location, if a deviation in the angular position of the logger device from said reference angular position exceeds a pre-defined limit.

Accordingly, a method is provided that eliminates said false positive events by utilizing said unique reference angular position of the logger device. It is thus now possible to determine in due time if the angular displacement of an asset is due to real event or not. This may as an example automatically trigger an alarm that the orientation of the asset must be changed back to the initial angular position. Moreover, irrespective of an initial angular position of how the logger device is associated to the packaging material, e.g. horizontally vs. vertically or 45 degrees, the fact that the initial angular position is provided as a unique reference angular position for each individual logger device eliminates the previously mentioned issues with the orientational placement of the logger device at the very beginning of the shipment.

In an embodiment, the step of measuring the initial angular position prior to starting the transport from the beginning location is performed at a pre-set time interval, where the logger device comprises a memory for storing the measured initial angular position, a communication module and a processor for controlling the memory and the communication module, where the controlling includes instructing, by the processor, the communication module to transmit the stored measured initial angular position to an external control computer, where the external control device is configured to store and utilize the measured angular position as said unique reference angular position of the logger device. The external control computer may be any type of computer platform that is configured to manage as an example all data measured by the logger device, and this may include, but is not limited to, the temperature of the asset, humidity, and light intensity. The logger device may be configured to transmit this data at a pre-defined time interval, e.g. every 1 hour, to the external control computer.

The measured angular position may be detected using an accelerometer or a gyroscope comprised in the logger device. In case of using the accelerometer, the accelerometer can be used to measure the static angle of tilt or inclination of the logger device and thus of the asset. Accordingly, if the logger device is placed at a 45° inclination, whereas in prior art solutions it is essential that the initial position of the asset is horizontal, the 45° is utilized as the unique initial reference angular position. Additionally, said pre-defined limit might as an example be set as ±3°, meaning that if during the shipment the measured angular position becomes 49°, i.e. +4° from the unique initial reference value, an alarm might be triggered indicating that the inclination of the asset is too high.

In an embodiment, the step of measuring the initial angular position of the logger device prior to starting the transport from the beginning location is repeated multiple times over a pre-defined time interval, where the step of utilizing the measured angular position as a unique reference angular position is determined by the external control computer if the transmitted angular positions are within a given uncertainty limit. A reliable solution is thus provided to ensure that after the logger device is turned on and associated to the packaging that this is the unique initial angular position. This could as an example be useful at the start of the shipment where the logger maybe placed in an unstable manner together with the asset. This pre-defined time interval might as an example be several minutes, e.g. 10, 20 or 30 minutes, where if the measured angular positions are more or less the same it would then be considered as the reference angular position or the average of these angular positions may be utilized as the reference angular position.

In an embodiment, the method further comprises placing a cooling agent into an inner side of the packaging material for maintaining the asset below a pre-defined target temperature during the transport from the beginning location to the destination location, and where the cooling agent is placed such that the cooling agent encloses the asset.

In an embodiment, the method further comprises a step of triggering an alarm signal during the transport if the deviation in the angular position of the logger device from said reference angular position exceeds the pre-defined limit. The triggered alarm indicates that the orientation of the assets must be changed back to safe angular positioning.

In an embodiment, two or more different assets have different unique reference angular position, and where said pre-defined limit is dependent on the characteristic property and/or sensitivity of the assets being transported. Thus, it is now possible to take the different characteristics/sensitivity into account with respect to the angular reference threshold where the asset may e.g. be a medicine when generating the shipment. As an example, one type of medicine might be a vaccine where the cooling agent is dry ice and where the temperature of the medicine is not supposed to go above −70 or −80 degrees, whereas another type of medicine is less sensitive and only needs ice cubes as a cooling agent where the temperature is not supposed to go below 0 degrees. In the former case, the angular reference threshold might be lower than in the latter case.

In an embodiment, the logger device is further configured to be used for real time monitoring environmental related parameter of the asset such as the temperature, humidity, light intensity, and where the communication module is further configured to transmit position data of the logger devices together with measured environmental related data of the asset to the external control computer with a given frequency such as once every hour and, in that way, enabling a real time supply chain monitoring solution during the transport of the assets. By doing so, it is possible to monitor the position and the environmental condition of the assets in real time meaning that issues such as the temperature of the asset being too high or too low may be identified before these issues escalate which allows for proactive actions to prevent the assets from being damaged.

The assets enclosed within the packaged may also, in addition to medicine, be food or beverages, and where said products have a predetermined desirable temperature parameter or be within a certain temperature window, where in case of a deviation in said temperature parameter or temperature window for a predetermined duration of time, the products integrity and quality are affected. This may thus via the real time monitoring be avoided.

In a second aspect of the invention, a system is provided for monitoring in real time an angular position of an asset while transporting the asset from a beginning location to a destination location, comprising:
  a logger device configured to be associated, prior to starting the transport from the beginning location, to the asset by either placing the logger device into an inner side of a packaging material containing the asset or at an outer side of the packaging material, where the logger device comprises:
  a. a power source,
  b. a communication module,
  c. at least one sensor including an angular position sensor,
  d. a memory, and
  e. a processor for operating the communication module, the at least one sensor and the memory,
  an external control computer,
  wherein subsequent to turning the logger device to a power-on mode and associating the logger device to the asset, the processor instructs the angular position sensor to measure an initial angular position of the logger device prior to starting the transport from the beginning location, where the processor further instructs the communication module to transmit the measured angular position to the external control computer where the angular position is stored,
  wherein the angular position is configured to be utilized as a unique reference angular position for the logger device during transport from the beginning location to the destination location,
  wherein the external control computer is configured to determine, subsequent to the start of the transport from the beginning location, if a deviation in an angular position of the logger device from said reference angular position exceeds a pre-defined limit.

Accordingly, a system is provided configured to avoid false positive alarms of tilted package such as tilted boxes or otherwise, where if the logger was carelessly placed inside the packaging material i.e., vertically or otherwise, the external control computer, using a comparison of the real time angular positioning value with the reference initial angular positioning value would still be able to recognize that only the logger is positioned incorrectly, and not the assets themselves and would not send an invalid alarm to reposition said assets.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
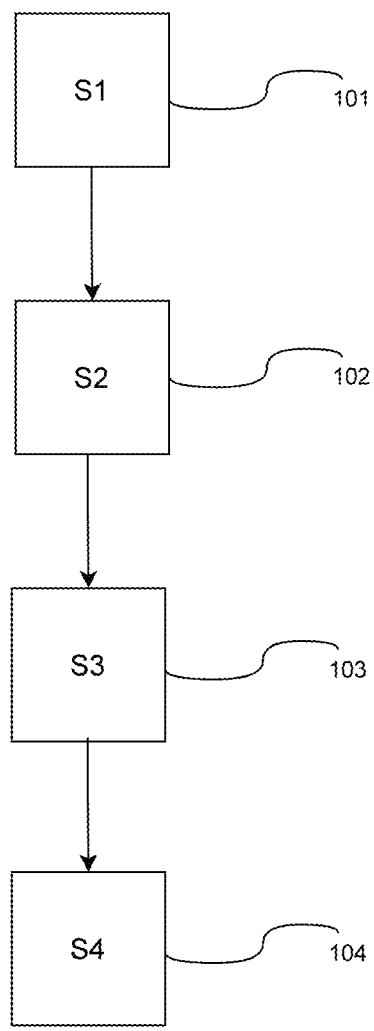
FIG. 1 depicts a flowchart of an embodiment of a method according to the present invention.

FIG. 1 shows an embodiment of a method according to the present invention of a method of monitoring in real time an angular position of an asset while transporting the asset from a beginning location to a destination location, where the monitoring is performed using a logger device. The asset may as an example be, but is not limited to, a medical product, food product or beverages.

In a first step (S1) 101, the logger device is switched from being in a power-off mode to a power-on mode. This may as an example be a manual process where an operator e.g. presses "on" button on the logger device.

In a second step (S2) 102, the logger device is associated, prior to the start of the transport, to the package either by associating said logger within the packaging material containing the asset or on the outer side of the packaging material. This is illustrated in more details in FIGS. 2 to 4 that will be discussed in more details later.

In a third step (S3) 103, an initial angular position of the logger device is measured using a sensor comprises in the logger device prior to the start of the transport. The initial angular position measurement is then sent by a communication module comprised in the logger device to an external control computer prior to starting the transport from the beginning location, where the initial angular position measurement is utilized as a unique reference angular positioning of the shipment.

In an embodiment the measuring may be performed at a pre-set time interval after setting the logger device to on-power mode. During this pre-set time interval the step of measuring the initial angular position of the logger device prior to starting the transport from the beginning location is repeated multiple times. In that way, the step of utilizing the measured angular position as a reference angular positioning is determined by the external control computer if the transmitted angular positions are within a given uncertainty limit, where the unique reference angular position may be based on calculating the average of these values.

In a fourth step (S4) 104, the method further includes the step of determining, subsequent to the start of the transport from the beginning location, if a deviation in an angular position of the logger device from said reference angular position exceeds a pre-defined limit. Thus, an alarm may be triggering during the transport if the angular deviation exceeds this pre-defined limit indicating that the orientation of the assets must be changed back to the reference angular positioning.

In an alternative embodiment, two or more different assets having different characteristic property have a different angular reference threshold assigned to the assets, and where said pre-defined threshold may be dependent on this characteristic property, e.g. the sensitivity of the assets being transported.

Figure 2:
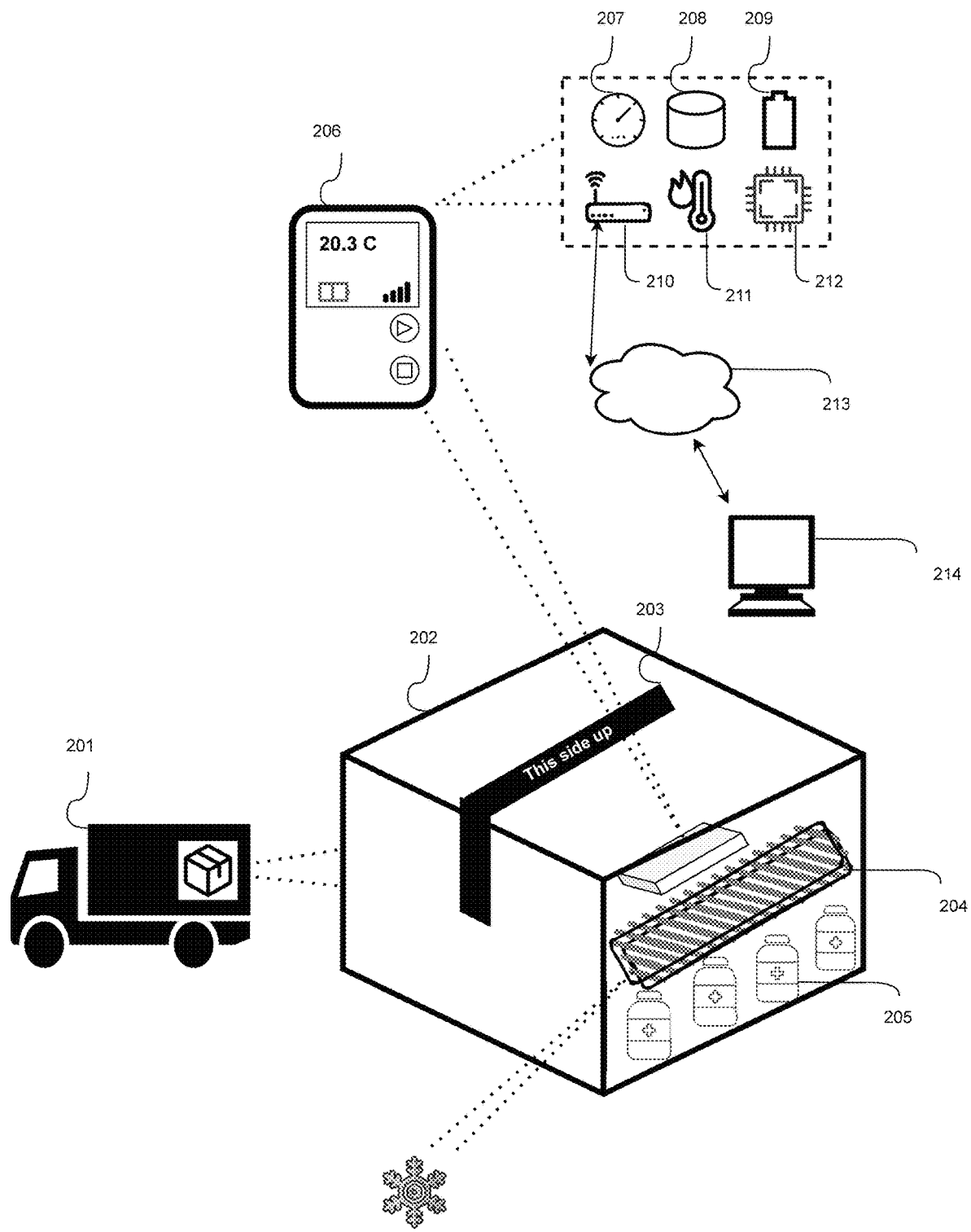
FIGS. 2-4 depict three examples of an embodiment of a shipment order according to the present invention wherein the logger is associated within the packaging material and is turned on prior to the start of the transport.
Figure 3:
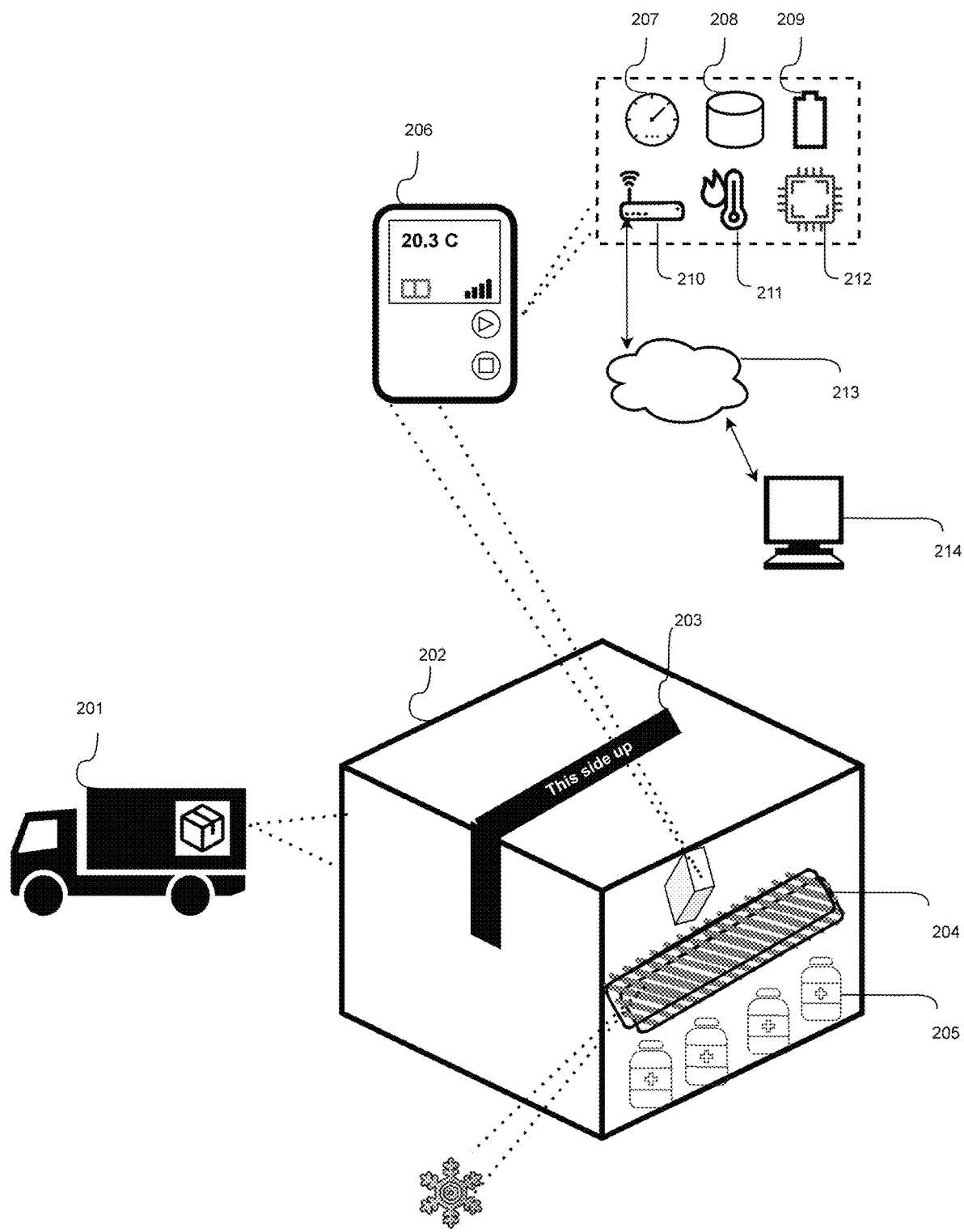
Figure 4:
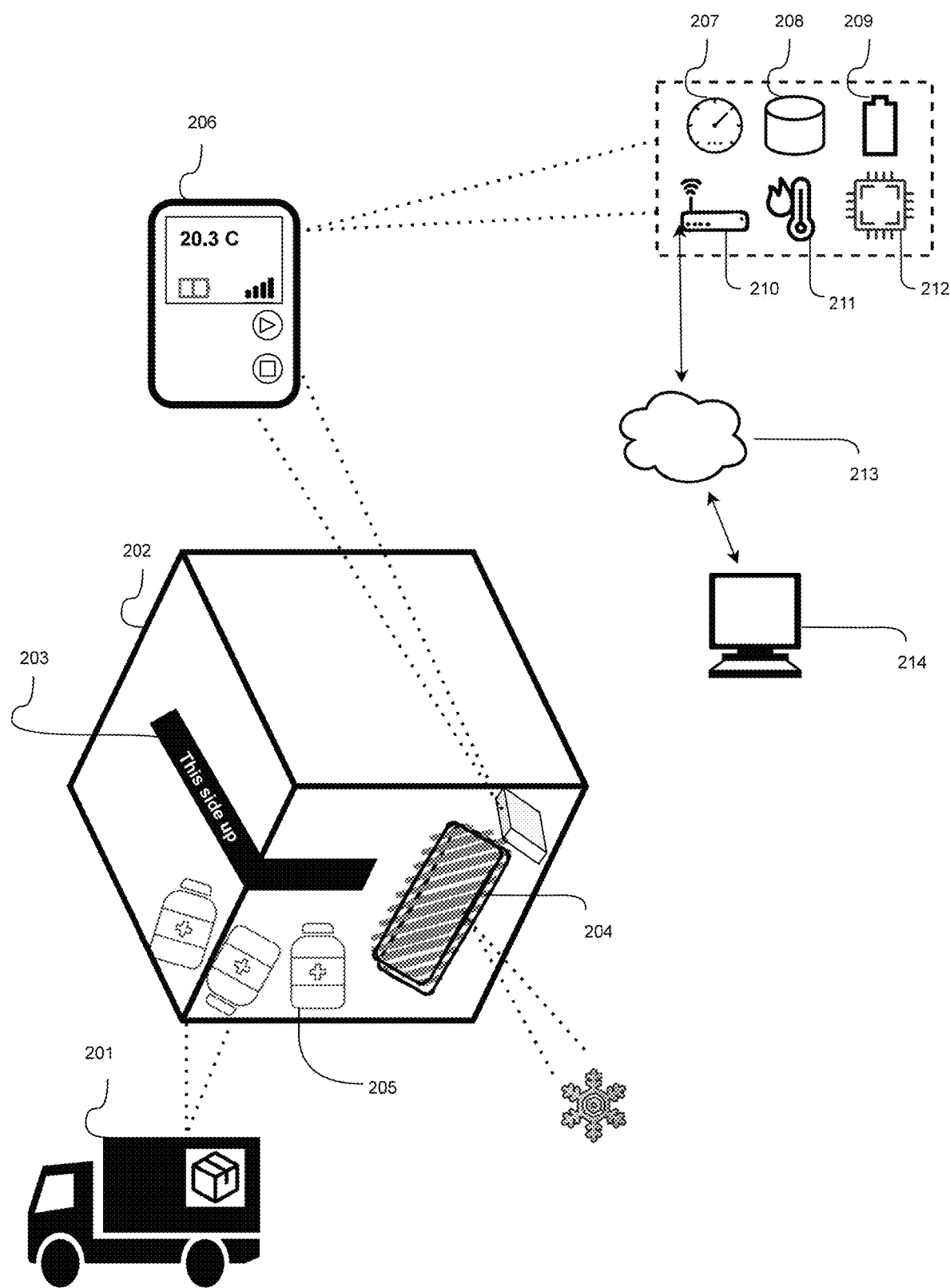

FIGS. 2 to 4 depict different examples according to the present invention for monitoring in real time an angular position of an asset while transporting the asset from a beginning location to a destination location as discussed in relation to the flowchart in FIG. 1.

As shown, the logger device 206 is onboard a transport truck 201. During preparation of the shipment from the beginning location as discussed above the logger device 206 is placed into a box 202 containing an asset 205. The logger device comprises an angular position sensor 207 for measuring initial angular positioning values, a memory unit 208 to store the initial reference measured angular positioning value, a power source 209, a communication module 210 to connect and send stored angular positioning values to an external cloud 213 which in turn connects with an external control computer 214. The logger device may further comprise a temperature sensor 211 for real time monitoring of the temperature to ensure that the assets 205 are kept by cooling media such as dry ice 204 at a desirable temperature throughout the length of the shipment, and a processor unit 212 responsible for controlling the functions of the communication unit 210 and the sensors mentioned above.

In an embodiment, the angular position sensor 207 measures over a certain time interval at the start of the shipment and before the transport starts the initial reference positioning value of the logger 206. These values are transmitted, by the communication device 210 via the cloud and to the external control computer 214 that compares the multiple of measured values. If the comparing results in that the values are the same or essentially the same, these values or an average of these values is used as the unique reference angular positioning of the logger 206 during the transport from the origin location to the destination location.

According to the present invention, the initial angular position of the logger device is not relevant because this angular position will uniquely identify the initial position be used a reference value. Thus, irrespective of whether the logger device 206 was placed horizontally as depicted in FIG. 2 or vertically as depicted in FIG. 3, there will be now false positive alarm issued later during the shipment.

FIG. 4 illustrates a scenario during the shipment where the deviation in the angular position of the logger device from FIG. 2 or 3 from the reference angular position exceeds a pre-defined limit and where notification or alarm would be issued and transmitted to the external control computer 214.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of monitoring in real time an angular position of an asset while transporting the asset from a beginning location to a destination location, where the monitoring is performed using a logger device, wherein the logger device includes a power source, a communication module, at least one sensor including an angular position sensor, a memory, and a processor for operating the communication module, the at least one sensor, and the memory, the method comprising:

turning the logger device to a power-on mode,
  associating, prior to starting the transport from the beginning location, the logger device to the asset by either placing the logger device into an inner side of a packaging material containing the asset or at an outer side of the packaging material,
  measuring, by the at least one sensor including the angular position sensor and subsequent to associating the logger device to the asset, an initial angular position of the logger device prior to starting the transport from the beginning location,
  transmitting, by the communication module, based on instructions from the processor, the measured angular position to an external control computer where the angular position is stored,
  wherein the measured angular position is utilized as a unique reference angular position for the logger device during transport from the beginning location to the destination location, and where the method further comprises:
  determining, by the external control computer and subsequent to the start of the transport from the beginning location, if a deviation in the angular position of the logger device from said reference angular position exceeds a pre-defined limit.

2. The method according to claim 1, wherein the step of measuring the initial angular position prior to starting the transport from the beginning location is performed at a pre-set time interval, where the memory of the logger device is configured for storing the measured initial angular position, and where the communication module transmits the stored measured initial angular position to the external control device.

3. The method according to claim 2, wherein the step of measuring the initial angular position of the logger device prior to starting the transport from the beginning location is repeated multiple times over a pre-defined time interval, where the step of utilizing the measured angular position as a reference angular positioning is determined by the external control computer if the transmitted angular positions are within a given uncertainty limit.

4. The method according to claim 1, further comprising placing a cooling agent into an inner side of the packaging material for maintaining the asset below a pre-defined target temperature during the transport from the beginning location to the destination location, and where the cooling agent is placed such that the cooling agent encloses the asset.

5. The method according to claim 1, further comprising triggering an alarm signal during the transport if the deviation in the angular position of the logger device from said reference angular position exceeds the pre-defined limit indicating that an orientation of the asset must be changed back to the reference angular positioning.

6. The method according to claim 5, wherein two or more different assets have a different unique reference angular position, and where said pre-defined limit is dependent on the characteristic property and/or sensitivity of the assets being transported.

7. The method according to claim 1, where the asset enclosed within the packaging material comprises medical or food products, and where said products have a predetermined desirable temperature parameter and in case of a deviation in said temperature parameter for a predetermined duration of time notification is generated indicating that integrity and quality of said products is potentially under a risk.

8. A system for monitoring in real time an angular position of an asset while transporting the asset from a beginning location to a destination location, comprising:

a logger device configured to be associated, prior to starting the transport from the beginning location, to the asset by either placing the logger device into an inner side of a packaging material containing the asset or at an outer side of the packaging material, where the logger device comprises:
  a power source,
  a communication module,
  at least one sensor including an angular position sensor,
  a memory, and
  a processor for operating the communication module, the at least one sensor and the memory,
  an external control computer,
  wherein subsequent to turning the logger device to a power-on mode and associating the logger device to the asset, the processor instructs the angular position sensor to measure an initial angular position of the logger device prior to starting the transport from the beginning location, where the processor further instructs the communication module to transmit the measured angular position to the external control computer where the angular position is stored,
  wherein the angular position is configured to be utilized as a unique reference angular position for the logger device during transport from the beginning location to the destination location,
  wherein the external control computer is configured to determine, subsequent to the start of the transport from the beginning location, if a deviation in an angular position of the logger device from said reference angular position exceeds a pre-defined limit.

9. The system according to claim 8, wherein the angular position sensor comprises accelerometer or a gyroscope.

10. The system according to claim 8, wherein the measured initial angular position of the logger device is stored in the memory of the logger device and where the communication module transmits the stored measured initial angular position to the external control device.

* * * * *